(12) United States Patent
Marlow et al.

(10) Patent No.: US 9,143,324 B2
(45) Date of Patent: Sep. 22, 2015

(54) SECURE MESSAGING

(71) Applicant: PROTECTED MOBILITY, LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: PROTECTED MOBILITY, LLC, Rockville, MD (US)

( * ) Notice: Subject to any disclaimer, the term of this patent is extended or adjusted under 35 U.S.C. 154(b) by 0 days.

(21) Appl. No.: 13/670,925

(22) Filed: Nov. 7, 2012

(65) Prior Publication Data

US 2013/0275758 A1    Oct. 17, 2013

Related U.S. Application Data

(60) Provisional application No. 61/556,635, filed on Nov. 7, 2011.

(51) Int. Cl.
*H04L 9/28* (2006.01)
*H04L 9/08* (2006.01)

(52) U.S. Cl.
CPC ............ *H04L 9/0861* (2013.01); *H04L 9/0841* (2013.01)

(58) Field of Classification Search
CPC .... H04L 9/3242; H04L 9/0861; H04L 9/0841
USPC .......... 713/171, 150, 161, 168–169; 726/2, 4
See application file for complete search history.

(56) References Cited

U.S. PATENT DOCUMENTS

| 5,592,555 | A | 1/1997 | Stewart |
| 6,125,281 | A | 9/2000 | Wells et al. |
| 6,356,937 | B1 | 3/2002 | Montville et al. |
| 7,076,657 | B2 * | 7/2006 | Koukoulidis et al. ......... 713/171 |
| 7,424,615 | B1 | 9/2008 | Jalbert et al. |
| 7,702,898 | B2 * | 4/2010 | Tan .............................. 713/150 |

(Continued)

FOREIGN PATENT DOCUMENTS

WO    WO 0195558    12/2001

OTHER PUBLICATIONS

May 23, 2014 Office Action in U.S. Appl. No. 13/670,994.

(Continued)

*Primary Examiner* — Andrew Nalven
*Assistant Examiner* — Mary Li
(74) *Attorney, Agent, or Firm* — Nixon & Vanderhye P.C.

(57) ABSTRACT

Given the rise in popularity of communicating personal, private, sensitive, or vital peer-to-peer or peer-to-group information over insecure text messaging infrastructure, it would be highly desirable to provide a lightweight solution that enables the exchange of information in a secure manner. The non-limiting technology herein provides systems and methods for the exchange of cryptographic material that can be used to encipher message-oriented communications between at least two peer devices. Once the cryptographic material is exchanged between cooperating peers, this lightweight solution can be used by common off the shelf hardware such as smartphones, tablets, feature phones, or special purpose machine to machine devices for private communications, such as command and control, location services, etc. using insecure voice or data communication paths, such as SMS.

18 Claims, 8 Drawing Sheets

(56) References Cited

U.S. PATENT DOCUMENTS

| | | | |
|---|---|---|---|
| 8,064,606 B2 * | 11/2011 | Schuba et al. | 380/277 |
| 8,386,800 B2 * | 2/2013 | Kocher et al. | 713/189 |
| 8,464,061 B2 | 6/2013 | Bradley | |
| 2002/0123967 A1 | 9/2002 | Wang | |
| 2004/0171369 A1 | 9/2004 | Little et al. | |
| 2005/0232422 A1 | 10/2005 | Lin et al. | |
| 2006/0158460 A1 | 7/2006 | Uh | |
| 2006/0246956 A1 | 11/2006 | Park et al. | |
| 2007/0022295 A1 | 1/2007 | Little et al. | |
| 2007/0072564 A1 | 3/2007 | Adams | |
| 2007/0083766 A1 | 4/2007 | Farnham et al. | |
| 2007/0180230 A1 * | 8/2007 | Cortez | 713/156 |
| 2007/0185815 A1 * | 8/2007 | Boccon-Gibod et al. | 705/51 |
| 2008/0313458 A1 | 12/2008 | Fascenda et al. | |
| 2009/0055643 A1 | 2/2009 | Brown et al. | |
| 2009/0169013 A1 | 7/2009 | Fascenda et al. | |
| 2009/0185677 A1 * | 7/2009 | Bugbee | 380/28 |
| 2009/0228707 A1 | 9/2009 | Linsky | |
| 2009/0265552 A1 | 10/2009 | Moshir et al. | |
| 2009/0268902 A1 | 10/2009 | Fascenda et al. | |
| 2010/0020972 A1 * | 1/2010 | Baugher et al. | 380/255 |
| 2010/0159962 A1 | 6/2010 | Cai et al. | |
| 2011/0138170 A1 | 6/2011 | Fascenda et al. | |
| 2011/0138172 A1 | 6/2011 | McCreight et al. | |
| 2011/0194695 A1 | 8/2011 | Fascenda et al. | |
| 2012/0054493 A1 | 3/2012 | Bradley | |
| 2012/0239417 A1 | 9/2012 | Pourfallah et al. | |
| 2012/0239560 A1 | 9/2012 | Pourfallah et al. | |
| 2012/0308001 A1 * | 12/2012 | Arnold et al. | 380/44 |
| 2013/0030828 A1 | 1/2013 | Pourfallah et al. | |

OTHER PUBLICATIONS

Aug. 16, 2012 & Oct. 4, 2013 Office Actions in U.S. Appl. No. 12/940,213.

Aug. 1, 2013 & Mar. 7, 2014 Office Actions in U.S. Appl. No. 13/328,706.

Feb. 25, 2014 Office Action in U.S. Appl. No. 13/671,054.

* cited by examiner

SECURE MESSAGING

CROSS-REFERENCES TO RELATED APPLICATIONS

This application claims the benefit of and is related to the following copending related U.S. patent applications, all of which are incorporated herein by reference:

U.S. Provisional Patent Application No. 61/556,635 filed Nov. 7, 2011 entitled "Secure Messaging";

U.S. patent application Ser. No. 12/940,213 filed Nov. 5, 2010 entitled "Mobile Workforce Applications Which Are Highly Secure and Trusted for the US Government and Other Industries";

U.S. Provisional Patent Application No. 61/351,979 filed Jun. 7, 2010 entitled "Mobile Workforce Applications Which Are Highly Secure and Trusted for the US Government and Other Industries";

U.S. Provisional Patent Application No. 61/556,652 filed Nov. 7, 2011 entitled "Systems And Methods Using One Time Pads During The Exchange Of Cryptographic Material" and counterpart non-provisional application no. 13/670,994, now U.S. Pat. No. 8,924,706 issued Dec. 30, 2014, filed concurrently herewith;

U.S. Provisional Patent Application No. 61/556,734 filed Nov. 7, 2011 entitled "Systems And Methods Enabling A Short Message Service Gateway Via Cloud Computing Services", U.S. Provisional Patent Application No. 61/562,314 filed Nov. 21, 2011 entitled "Systems And Methods Enabling A Short Message Service Gateway Via Cloud Computing Services" and counterpart non-provisional application no. 13/671,054, now U.S. Pat. No. 8,892,139 issued Nov. 18, 2014, filed concurrently herewith; and U.S. Provisional Patent Application No. 61/557,598 filed Nov. 9, 2011 entitled "Systems And Methods For Enabling Secure Messaging, Command, And Control Of Remote Devices, Communicated VIA A Short Message Service Or Other Message Oriented Communications Mediums" and counterpart non-provisional application no. 13/671,026 filed concurrently herewith.

STATEMENT REGARDING FEDERALLY SPONSORED RESEARCH OR DEVELOPMENT

N/A

FIELD

The technology herein relates to secure short messaging, and more particularly to contact and/or registration exchange for establishing secure short messaging exchanges between devices.

BACKGROUND AND SUMMARY

With the proliferation of inexpensive handheld communications devices such as mobile phones, texting has become a popular way to communicate. Based on the "Short Message Service" ("SMS") standardized by GMS wireless telephone network carriers worldwide since the mid-1980's, texting involves sending a message containing a maximum, relatively small number of characters (for example, 140 bytes or 160 7-bit characters in one non-limiting scenario) per message based on standard alphabets. Other data messaging services such as Twitter similarly constrain message length e.g., to 140 characters. Certain other messaging standards such as MMS permit transmission of a variety of other data such as multimedia.

Short messaging offers numerous advantages in terms of transport efficiency, succinctness and convenience, but there can be problems with security. Most short messages are sent and received in unsecured form. Interception by unauthorized people and spoofing are two of the problems that can arise from insecure short messaging. Hacking of insecure text messaging has caused numerous high-profile scandals and information leaks. Additionally, texting could be a valuable tool for law enforcement, the military and other government agencies if adequate end-to-end security could be provided.

While it would be highly desirable to secure short messaging, there are challenges to doing so. In particular, the short length, insecurity of the communications networks used to transport the messages and the relatively low processing power available on many devices commonly used to exchange short messages all present obstacles to introducing secure SMS or other secure short messaging.

Most secret or secure messaging is based on the concept of a "shared secret" that only the sender and receiver know. Such a shared secret can be a code book, a cryptographic key for the day or the session, a pseudorandom cryptographic key generated independently by each of the sender and the receiver based on shared "seed" data, or a variety of other mechanisms.

One of the many problems with ciphering data for messaging communications between devices that are connected over insecure voice or data networks is how to securely exchange the shared secret used to support cryptographic operations between the endpoints. Traditionally, a third party server or service is used to verify and/or exchange material between the devices used for this purpose—thus requiring a "middleman" computing device that may foreclose end-to-end secure communications between peers or other devices where no "middleman" is available. Other implementations may use heavyweight asymmetric encryption algorithms that while being quite secure are often not suitable for narrow bandwidth or short message oriented communications between devices having relatively low computing capabilities. Yet another approach is to share a secret key which is then used for a relatively long period of time and changed only rarely. While a individual message may be sent securely using this approach, key re-use can lead to insecurity based on frequency and traffic analysis. Nonce abuse (using the same cryptographic keying material more than once to encrypt different messages) may also allow attackers to compare multiple messages to derive the cryptographic keying material.

While much work has been done in the past, there remains a long-felt but unsolved need for an effective, robust secure technique for exchanging information needed to support secure short messaging.

The exemplary illustrative non-limiting technology herein provides non-limiting cryptographic processes and algorithms associated with ProtectedSMS that allow for a lightweight peer-to-peer exchange of cryptographic information over insecure communications links.

One example non-limiting implementation provides methods of exchanging information to enable secure messaging between first and second messaging devices involving encapsulating a first public key associated with a first device public-private key pair with a first identifier so that the encapsulated public key does not occupy more than half the available payload. The encapsulated first public key and first identifier are then communicated from the first device to the second device. The first device receives, from the second device, a response including a second public key and second identifier associated with the second device. The first device computes a shared secret based at least in part on the received second public key and uses the shared secret to encrypt or decrypt a short message sent over a messaging network. The short message can be time stamped to securely indicate when the message was actually sent. An acknowledgement of receipt can be received and transmitted. The encapsulation may occupy a short message of fixed or variable length such as a maximum of a single SMS or other secure message length (e.g., 140 text characters, 131 bytes, etc.).

The exemplary illustration technology herein avoids cryptographic collision of data and the cryptographic material to increase the level of security. In one example non-limiting illustrative implementation, a shared secret is derived from exchanged information such as secret public keys of PK key pairs. In one example, a well-known efficient but standard function that is proven to be computationally infeasible to hack (e.g., use of an elliptical curve based or other cryptographic algorithm) is used to derive shared secret cryptographic information from the public key.

The exemplary illustrative non-limiting light-weight technology herein is able to implement secure technology using a small amount of computational power of the type available on low-cost portable, mobile or any other end-to-end devices (e.g., any embedded processing technology) and within limited message length constraints. For example, the exemplary illustrative non-limiting technology provides a reduced or minimal message encapsulation having low consumption of available message payload. As one non-limiting example, by using less than 15% of available payload for security overhead of SMS messages, it is possible to provide defenses against known attacks while minimizing consumption of precious resources, namely processing power and/or characters in short messages being sent and received, and also reducing the probability of successful attacks due to cryptographic collision.

One exemplary illustrative non-limiting implementation provides unique combinations of:

technology that works successfully and securely for short or constrained message lengths;

ability to exchange shared secret key information through a bandwidth-challenged interface in a way that is not onerous on the users who are sending and receiving secure messages;

no additional infrastructure required beyond conventional components already in place for exchanging messages;

using a friending paradigms to exchange public keys or other cryptographic information;

low computational requirements enabling security on a wide variety of different platforms including very inexpensive devices;

other.

In simple terms, an illustrative ProtectedSMS can be used to protect data content in SMS, Twitter or other short messaging. Furthermore, this technology can be used to protect message oriented communications such as MMS, picture messages, email messages, other text documents/attachments, command and control messages, alerts messages, machine to machine messages, etc.

The illustrative ProtectedSMS provides a mobile or portable device with an ability to encrypt and decrypt messages exchanged with other users and devices who also have access to the ProtectedSMS protocol and application algorithms. ProtectedSMS can use public key cryptography as the basis for the algorithms that secure the data. The technology herein provides an example non-limiting "Contact Registration Exchange" for how two peers secure data between one another. Non-limiting technical overviews and detailed descriptions of example non-limiting cryptographic technology and techniques employed to secure SMS traffic are provided. One example non-limiting target platform with which the present technology can be useful is RIM's Blackberry operating system, Apple iPhones and iPads, or any desired SMS or other short messaging platforms.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Figure 1:
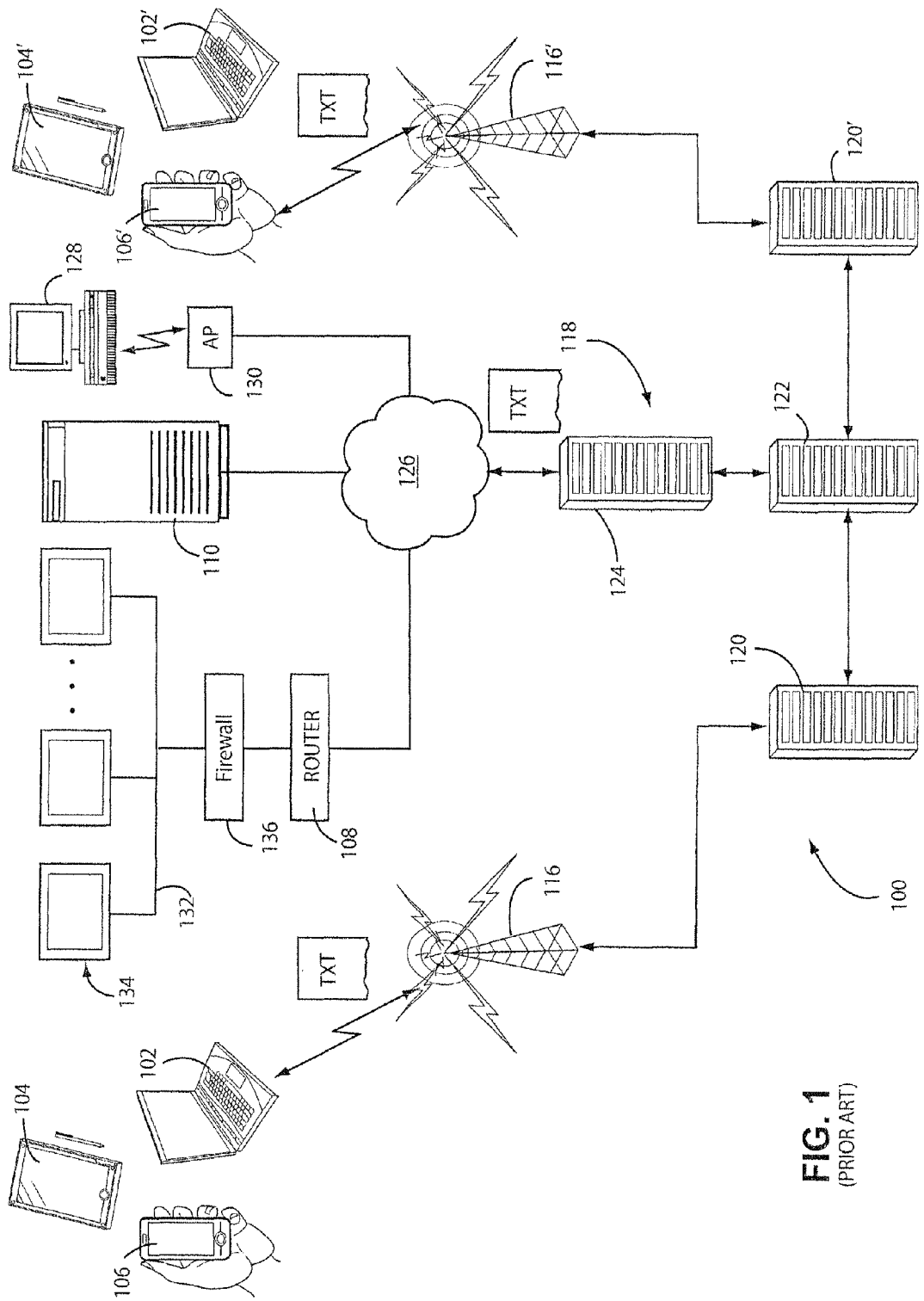
FIG. 1 schematically illustrates an exemplary illustrative non-limiting prior art conventional text or other messaging communication system.
Figure 1A:
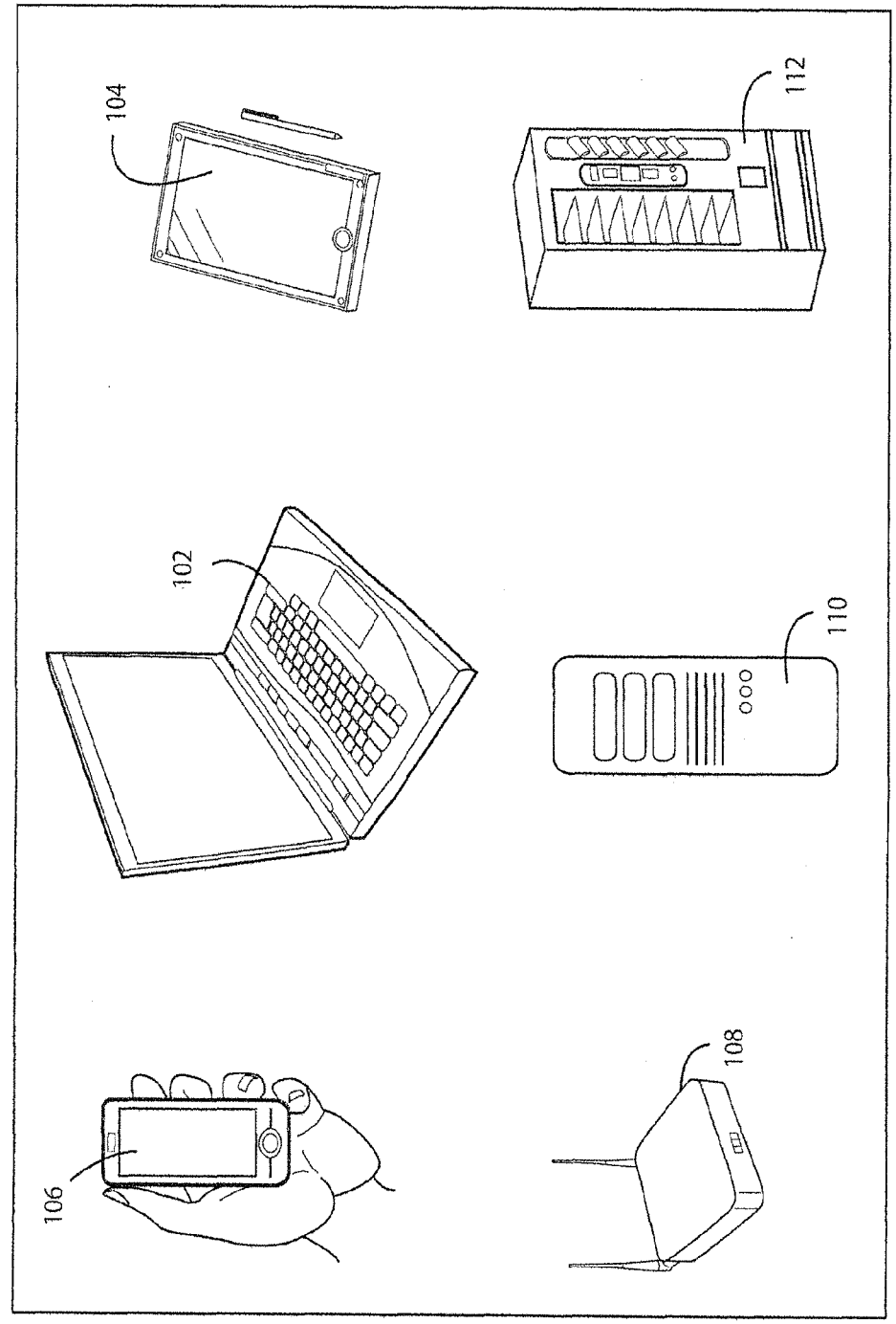
FIG. 1A shows non-exhaustive examples of end user or other devices that can be employed.

FIG. 1 shows an exemplary illustrative non-limiting prior art system or architecture for conveying messages between end-user devices. System 100 can be used with a variety of different kinds of end user or other devices (see e.g., FIG. 1A) including for example wireless or wired laptop computers 102, tablet computers 104, personal digital assistants or cell phones 106, routers 108, or virtually any other kind of device (see FIG. 1A for some non-limiting examples). Any such devices may have a need to communicate messages to any other such device.

In the particular example shown in FIG. 1, wireless connectivity is established between an end-user device such as tablet computer 104 and a personal digital assistant or cell phone 106' via a wireless communications infrastructure such as for example cellular telephone or other wireless transceivers linked together by various computers 118 to provide short messaging such as SMS. Computers 118 may include for example, one or more mobile switching centers 120, a short or other message service center 122, and one or more gateway mobile or other switching centers 124. Gateway 124 can provide connectivity via the Internet 126 or other networks with a variety of other wide or local area networks including but not limited to for example a directly-connected server 110, a computing device 128 linked by a hotspot or other access point 130; a local area network 132 connecting multiple computing devices 134 via a firewall 136 and router 108, or any other well known data communications infrastructure.

Figure 1B:
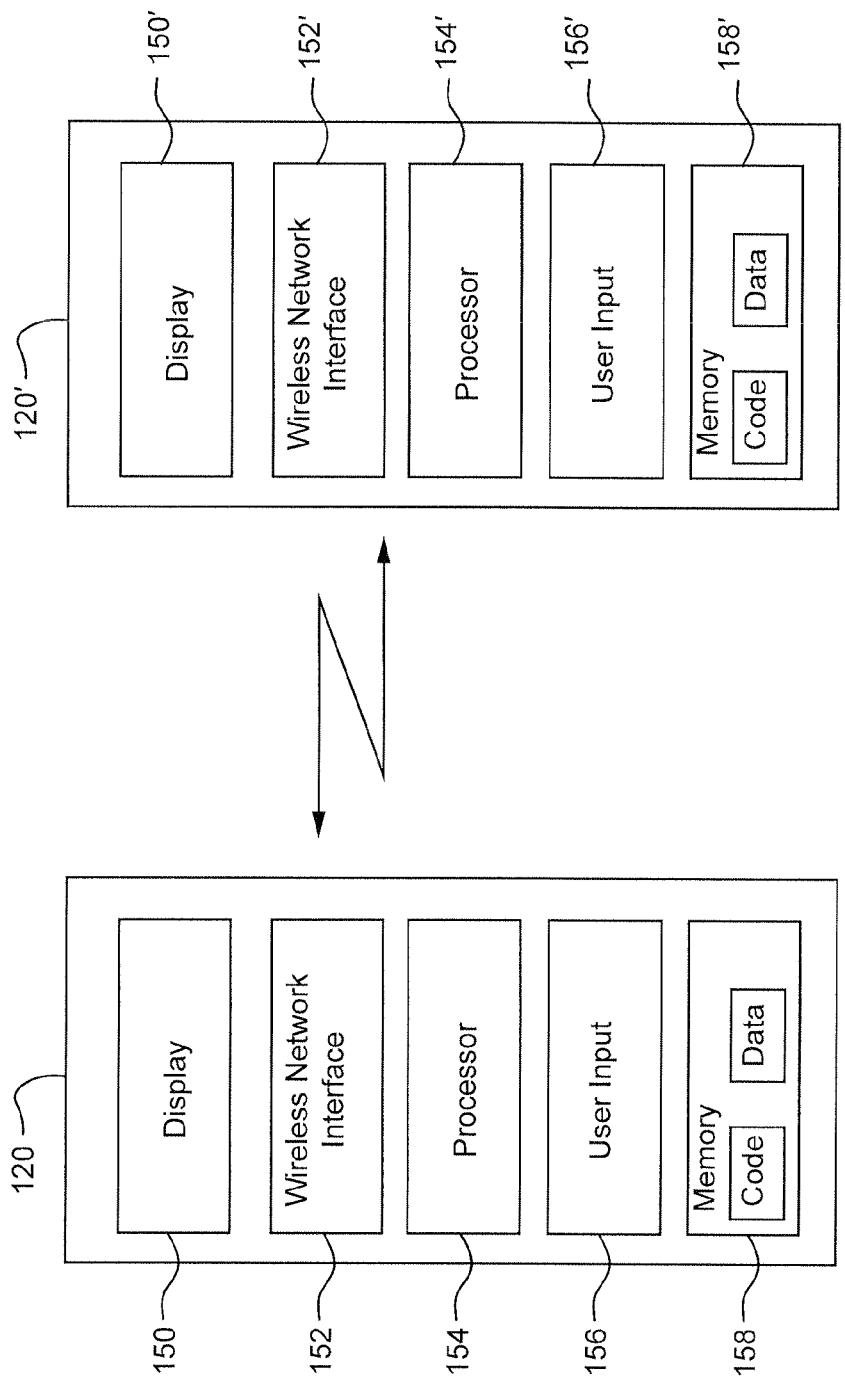
FIG. 1B shows illustrative non-limiting architectures for exemplary user devices.

FIG. 1B shows example non-limiting user devices 120, 120' each comprising a display device 150, a wireless or wired communications interface 152, a processor 154, a user input device (e.g., push buttons, keyboard, touch screen, etc.) 156, and a non-transitory memory device 158 that stores executable code and data. The processor 154 reads the code from the memory device 158 and executes it to process the stored data, receive and respond to user input via user input device 156, cause humanly-perceivable information to be displayed on display 150, and send and receive data via wireless network interface 152. The wireless network interface 152 may be any desired network interface including but not limited to 3G or 4G GSM, WiFi, WiMax, Ethernet, optical, wired, etc.

Briefly, in the example shown in FIG. 1, an end-user device such as 106 generates a message in a particular format. Such message may be formatted as for example an SMS (short message service). The well-known format of an SMS message is defined in ETSI TS 100 901 V7.5.0 (2001-12) and see also ETSI TS 100 900 V7.2.0 (1999-07), each incorporated herein by reference. Generally speaking (but see standards above for more detailed information), an SMS message may have the following format:

TABLE I

Length of the SMSC information in octets
Type of Address of the SMSC.
Service center number
First Octet of the SMS Deliver Message
Address-Length. Length of the sender number (0B hex = 11 dec)
Type of Address of the sender number
Sender number (decimal semi-octets), with a trailing "F"
TP-PID protocol identifier
TP-DCS data coding scheme
TP-SCTS. Time Stamp (semi-octets)
TP-UDL. User data length, length of message (units depend on the data coding scheme
TP-UD. Message (e.g., 8-bit octets representing 7-bit data)

Note that in accordance with current GSM standards, the maximum guaranteed length of TP-UD is 131 octets. Fewer octets (as few as zero) can be sent, but more than 131 octets are not guaranteed to be delivered. Therefore, to be compatible with the current GSM standard and existing cellular communications systems worldwide, a sender should not send an SMS message with more than 131 octets (1048 bits) of user data. Standards in the future may change.

Instead of SMS, a multi-media service (MMS) message, an email, a photograph or graphic, a Word document or other word processing file, a Power Point document, a Twitter "Tweet" or any other desired format may be used. The user of device 106 wishes to send this message to the user of another end-user device such as device 102' via data communications system 100. Assuming appropriate subscriptions, access permissions and the like are provided and in place, it is no problem for the end user of device 106 to appropriately address the message to the end user of device 102' and transmit it wireless or wired via system 100 for conveyance to the end user of device 102'. In a similar way, messages and data can be exchanged throughout system 100 between the various devices shown. In one exemplary illustrative non-limiting implementation, additional functionality is provided to register and exchange security information to provide secure short messaging between the devices 102, 102'.

Figure 2:
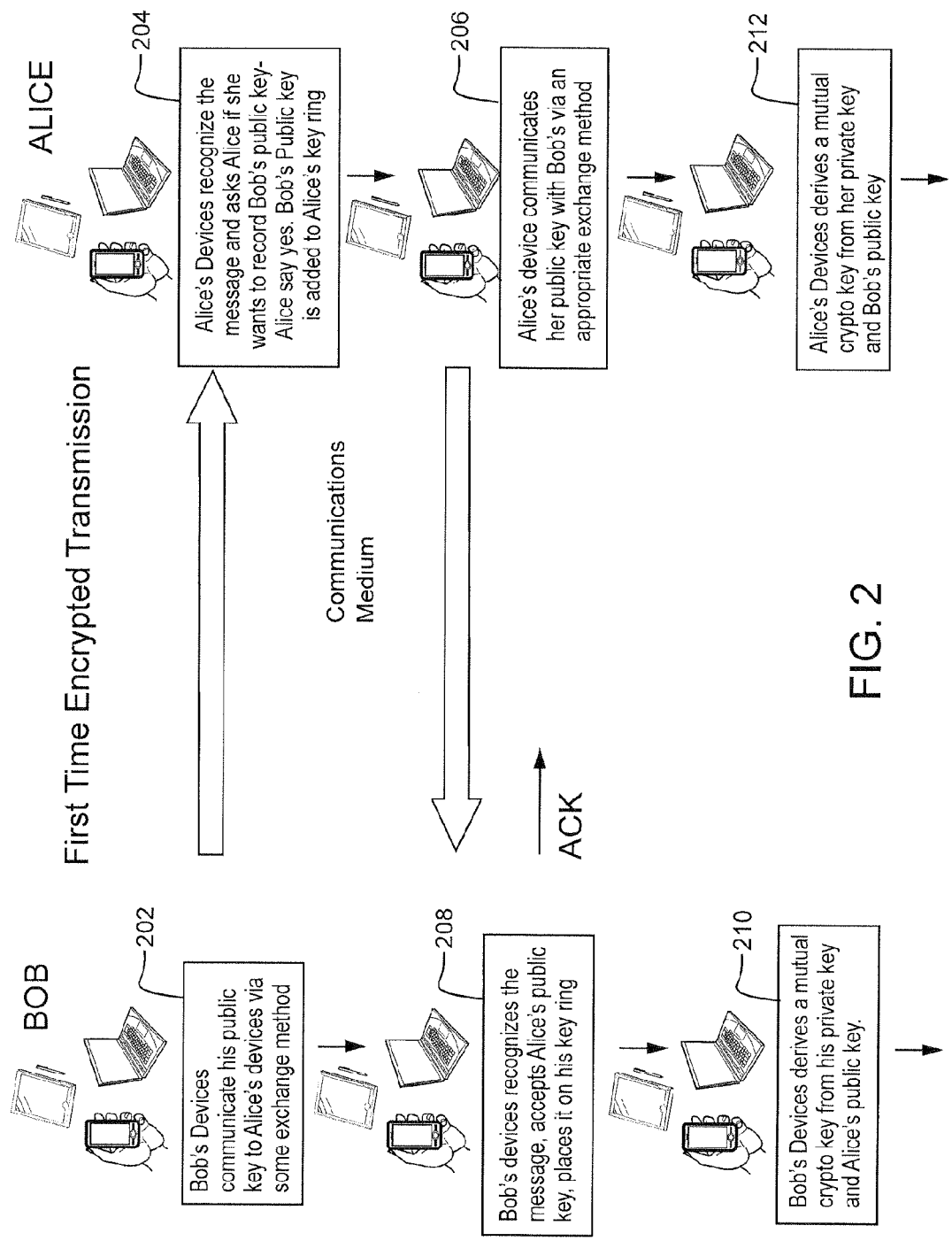
FIG. 2 schematically illustrates an example illustrative non-limiting secure message exchange between two user devices.

In one illustrative example shown in FIG. 2, the Contact Registration Exchange (CRE) is a process that an application follows to begin secure exchanges with a peer device that is running ProtectedSMS. The ProtectedSMS CRE process uses Elliptic Curve (EC) cryptography to establish public keys that can be exchanged with a peer device application. Initially, each party in a secure communication first generates a public/private key pair and then exchanges the public keys for later use in the ProtectedSMS cryptographic material derivation algorithm (see below for details). If used over a communications link between two devices, the CRE process is made up of a few steps:

1. A user/device 102 (Bob) selects a peer contact 102' (Alice) from a contact list and requests to send a "Hello" message to Alice that contains his public key (block 202).

2. Alice receives the message (and assuming she has ProtectedSMS installed on her device) decodes the "Hello" message and stores Bob's public key (block 204).

3. Alice then sends Bob a "Hello Response" message that contains her public key (block 206).

4. Bob receives the "Hello Response", decodes the message and stores Alice's public key (block 208).

5. At this point, each of the parties have the other's public key and the last step is for Bob to send a "Hello Acknowledgement" message to let Alice know he received her public key ("ACK").

Now Bob and Alice can each derive a mutual encryption key they can use to exchange secure messages (blocks 210, 212).

ProtectedSMS Secure Communications

The purpose of this exchange is to establish a local database on each peer device that includes each peer's public key information and associated contact information (i.e. network, network identifier such as a phone number, etc.). Please note that the exchange of cryptographic material can be accomplished by additional methods to populate a local contact database and may not need to use the communications medium/network that will ultimately be used for the actual messaging. For example, many devices today allow for the exchange of contact information over Bluetooth, InfraRed (IR), or other near field communications—a process colloquially referred to as "beaming". Alternatively, each peer's public key may be part of a vCard or VCF as specified by the IETF RFC 2425, 2426, 6350, 6351 specifications. The vCard may be an imported file onto a device, or sent to the device as an attachment of an email, etc. Once each peer's public key is exchanged and stored in the local database, and an acknowledgement is sent to the peer validating the correct population of the database.

The key exchange outlined allows for the computation of a shared value by employing the two pairs of public/private keys. Each side will use its own private key along with the peer's public key to generate this shared value (common point on the elliptic curve). The shared value that is generated will be used as a seed in the ProtectedSMS Key Derivation process. This shared value computation is specified as part of an ECDH protocol exchange described in IEEE publication 1363. The implementation and generation of the shared value are in for example stored API libraries on the device platform. Similar API libraries supplied on different devices either by the device manufacture or along with ProtectedSMS application provide compatible functionality. ProtectedSMS's cryptographic class/member functions abstracts these platform specific interfaces to provide the functionality needed for the upper layers of ProtectedSMS.

ProtectedSMS Cryptographic Material Derivation

To prevent against certain attack vectors, ProtectedSMS may use more than one key for the encryption and decryption of secured data. Each side of an exchange (i.e. Bob and Alice) may derive at least one key for transmission (Tx) and one key for reception (Rx). As input to this derivation we have the shared value (common point on the elliptic curve) that is mathematically calculated by the at least two parties, employing a peer's public key along with the correct private key. The derivation process yields at least one common key or value for symmetric ciphering operations.

Symmetric Key Generation

In one exemplary embodiment, symmetric key generation process includes computing of two separate keys. Each peer computes a transmit and a receive key. When looking at the system as a whole, one side's transmit key will match the other side's receive key and vice versa. The common shared value is used for all derivations. In order for clarity, the descriptions below will focus on one side of the peer-to-peer system at a time and use generic terminology for simplicity.

Transmit Key

When computing the transmit key, besides the key value itself, a nonce and a key for hashing are all generated. These values for ease of reference are labeled: TxKey, TxNonce, TxHmac. For TxKey, a keyed hash is performed over the at least a portion of the shared value using local public key as the hash key i.e.:

$$TxKey=SHA\text{-}HMAC(shared\ value)_{Key(local\ public\ key)}$$

Receive Key

When computing the receive keys much like the transmit key, there is also a nonce and a key for hashing generated. These values for ease of reference are labeled: RxKey, RxNonce, RxHmac. For RxKey, a keyed hash is performed over at least a portion of the shared value using the peer's public key as the hash key. I.e.:

$$RxKey=SHA\text{-}HMAC(share\ value)_{Key(peer's\ public\ key)}$$

Nonce and SHA-HMAC values

There are two other pieces of data that are generated as part of the derivation process:

1) The nonce values are used in the encryption and decryption process as initialization vectors (or IVs) and are also derived from computations on the shared value bytes.

2) A SHA-HMAC key value may be used when computing a message authentication code (or MAC) over at least a part of a message being encrypted. The HMAC key is a seed value used when computing the MAC using a SHA algorithm, thus, making the overall protection of the data more secure and harder for an attacker to modify because they would need possession of the seed key to modify the data stream.

Nonce Values:

The computations for the Nonce values may be the same whether it is a transmit or receive (encrypt or decrypt) operation taking place.

Figure 3:
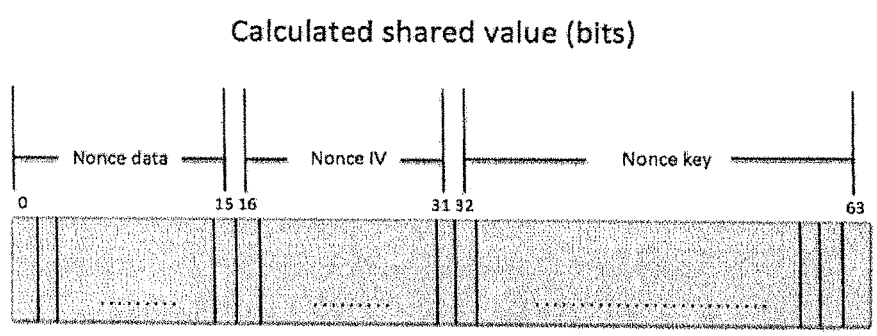
FIG. 3 is a non-limiting example of how a calculated shared value can be decomposed to provide cryptographic material for subsequent operations.

The nonce computation starts with a transmutation and/or different portion of the shared value as input. This input value is broken up into component parts to perform an AES encryption operation to arrive at a Nonce value. In one exemplary embodiment, FIG. 3 shows an exemplary illustrative non-limiting byte of the shared value can be used for an AES operation. Each computation that yields a nonce value, as input there is a key, a 16 byte initialization vector and 16 bytes of data to encrypt for the AES operation:

$$Nonce=AES(Nonce\ Data)_{Key(Nonce\ Key),\ IV(Nonce\ IV)}$$

Although the output of this operation yields a 16 byte value, only bytes 12 bytes of each Nonce value are used in one example non-limiting implementation of the cryptographic operations for securing ProtectedSMS data.

SHA-HMAC Computations

A keyed hash process requires a seed for the operation. A SHA-HMAC may be employed to sign the ProtectedSMS data. In one exemplary embodiment, the "hash seeds" are built upon the output from the nonce calculations described above. Since only 12 of the 16 bytes of the nonce are used in the cryptographic operations, the remaining 4 bytes of the nonce will be used as a portion of the hash seed followed by a mathematical computation on the extra 4 bytes as follows:

Zero out the 16 byte hash key value

Bytes 0-3 of Nonce in positions 0-3 of the resultant hash key

Mathematical xor operation of Bytes 0-3 of Nonce with Nonce bytes 4-7, where the output is transferred to positions 12-15 of the resultant hash key Other permutations can be easily be envisioned by those skilled in the art. This process results in at least a 16 byte hash seed that may be used for the authentication of ProtectedSMS data.

Please note that in one example non-limiting illustrative implementation, the hash key and the nonce are not communicated between the cooperating peers, but individually calculated by each, increasing the difficulty for a malicious party to guess the derived values.

Sequence Number Generation

The ProtectedSMS protocol requires that a per message sequence number is sent as a portion of the message payload. The sequence number can be used for a number of different purposes, including but not limited to defense against malicious attacks, and as a portion of the initialization vector.

Considering that the frequency of SMS messages between devices is typically not measured in sub second intervals, in one exemplary embodiment the sequence number is a 32-bit (4 byte) quantity defined as follows:

Bits 0-16=Number of one second increments of the current day where midnight UTC is zero.

Bits 17-31=Number of days elapsed since Jan. 1, 1970 (UTC).

The encoding of the sequence number in this way provides for approximately 89.7 years before a sequence number wrap situation would occur:

$$\#of\ Days=2^{15}-1=32767/365\ days \sim 89.7\ years$$

$$\#of\ one\ second\ increments\ per\ day=60\ secs*60\ min*24\ hours=86400<2^{17}(131072)$$

This minimizes potential reuse of the same nonce with the same key with different data. It also offers a timestamp or "born on" date for the message, which can be used for many purposes such as to determine whether or not the message should be processed/accepted by the receiver.

Ciphering Algorithm

In an exemplary embodiment, ProtectedSMS employs the AES ciphering algorithm using CBC with Cipher text stealing. This allows for no expansion of the data when encrypting the data. However other alternative cipher algorithms such as blowfish, as well as other modes of operation can be used such as AES-GCM to achieve similar results. The inputs to the encrypt and decrypt functions use a set of the key/nonce/hmac values specified above The nonce values will serve as a portion of the Initialization Vector (IV) along with the 4 byte sequence number to make a 16 byte IV as required by AES in CBC mode. In one exemplary embodiment The 12 bytes of the nonce value will be in positions 4-15 of the IV, while the 4 bytes from the sequence number will be in positions 0-3 of the IV.

$$IV=Sequence\ Number+12\ bytes\ of\ Nonce\ Data$$

ProtectedSMS Protocol

Figure 4:
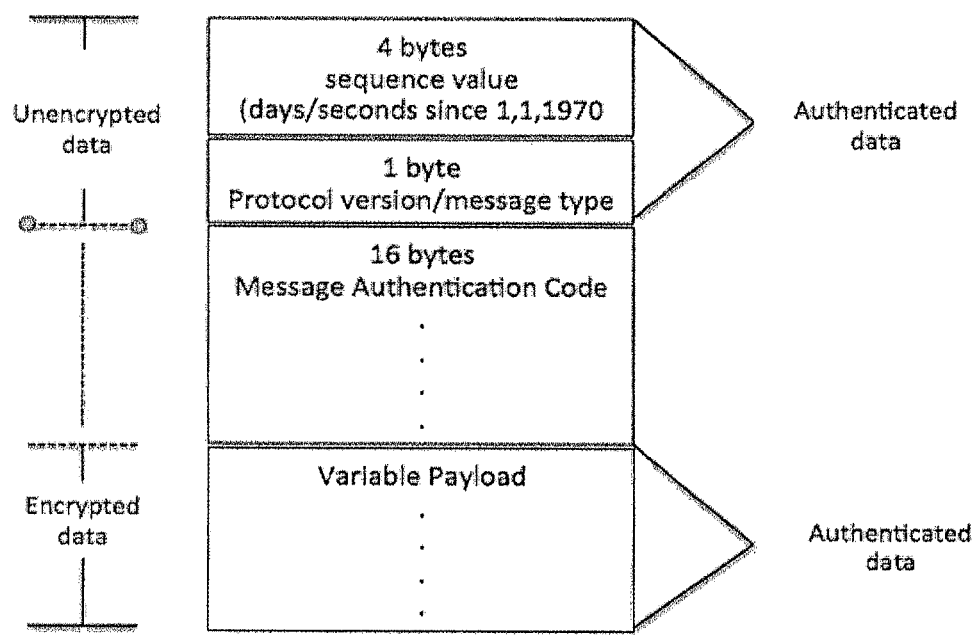
FIG. 4 depicts an example non-limiting minimal encapsulation used to send encrypted SMS messages.

An example non-limiting illustrative protocol for sending secure messages with ProtectedSMS will now be described. The basic illustrative protocol takes a minimal approach for adding overhead to the actual messages because of the brevity of SMS messaging inherently built in. Thus, at most the illustrative ProtectedSMS Protocol will add 21 bytes to an SMS message making the minimum size of a ProtectedSMS message 22 bytes if for example the user is sending a one letter response like 'k'. A ProtectedSMS message consists of a header (5 bytes) followed by a hash computed over the message (16 bytes) and finally the text of the message. FIG. 4 represents a ProtectedSMS secure message. Other alternative embodiments can easily be envisioned by ones schooled in the art, especially if payload and/or bandwidth limitations are removed.

The illustrative ProtectedSMS Protocol header contains 5 bytes and is transmitted to the recipient:

Bytes 0-4=The sequence number for this message.

Byte 5=Bits 0-3 is the protocol version and bits 4-7 are a message type indicator Bytes 6-21 16 bytes of hash signature data. The hash is computed over the header and the payload data.

Bytes 22 to N data/message payload (where N indicates the end of the message payload).

As shown in FIG. 4, the message is broken into an unencrypted portion and an encrypted portion. In one exemplary embodiment, the first 5 bytes are sent in the clear, and are use in processing the message upon arrival at the peer device. The remainder of the data is encrypted prior to sending the message. Depending on the cryptographic algorithm and mode of operation, the hash is computed over the entire message payload prior to the encryption process. Then the data from just after the first 5 bytes through the end are encrypted. Alternative encapsulations may be easily envisioned that modify/extend the placement or size of the header, payload data, and/or MAC, etc.

Message Transmission

Figure 5A:
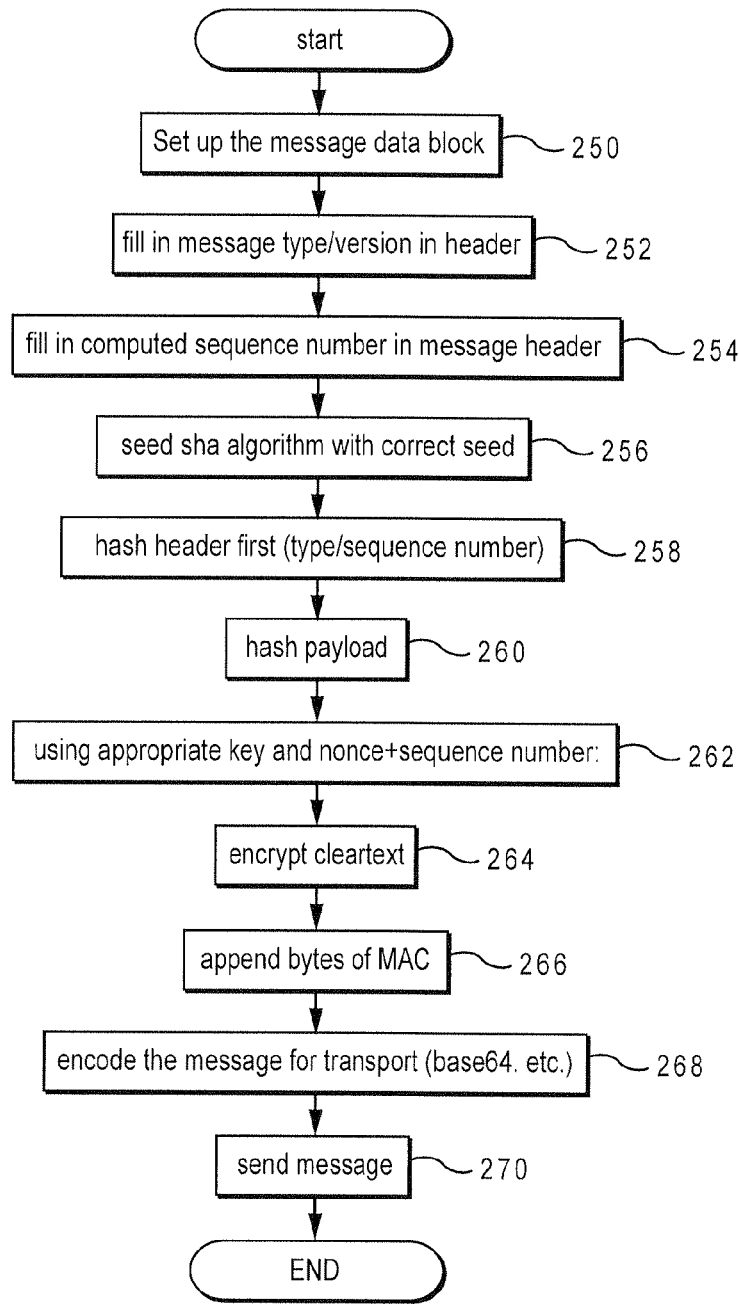
FIGS. 5A, 5B show example flowcharts of non-limiting steps that may be used to exchange encrypted SMS messages.

FIG. 5A shows example non-limiting illustrative steps to take when preparing a message for transmission when using Cipher Block Chaining or other comparable modes of operation:

Set up the message data block (250)
fill in message type/version in header (252)
fill in computed sequence number in message header (254)
seed sha algorithm with correct seed (256)
hash header first (type/sequence number) (258)
hash payload (260)
using appropriate key and nonce+sequence number: (262)
encrypt cleartext (264)
add bytes of MAC (may be enciphered or clear text depending on the application) (266)
encode the message for transport (base64, etc.) (268)
send message (270)

Message Reception

Figure 5B:
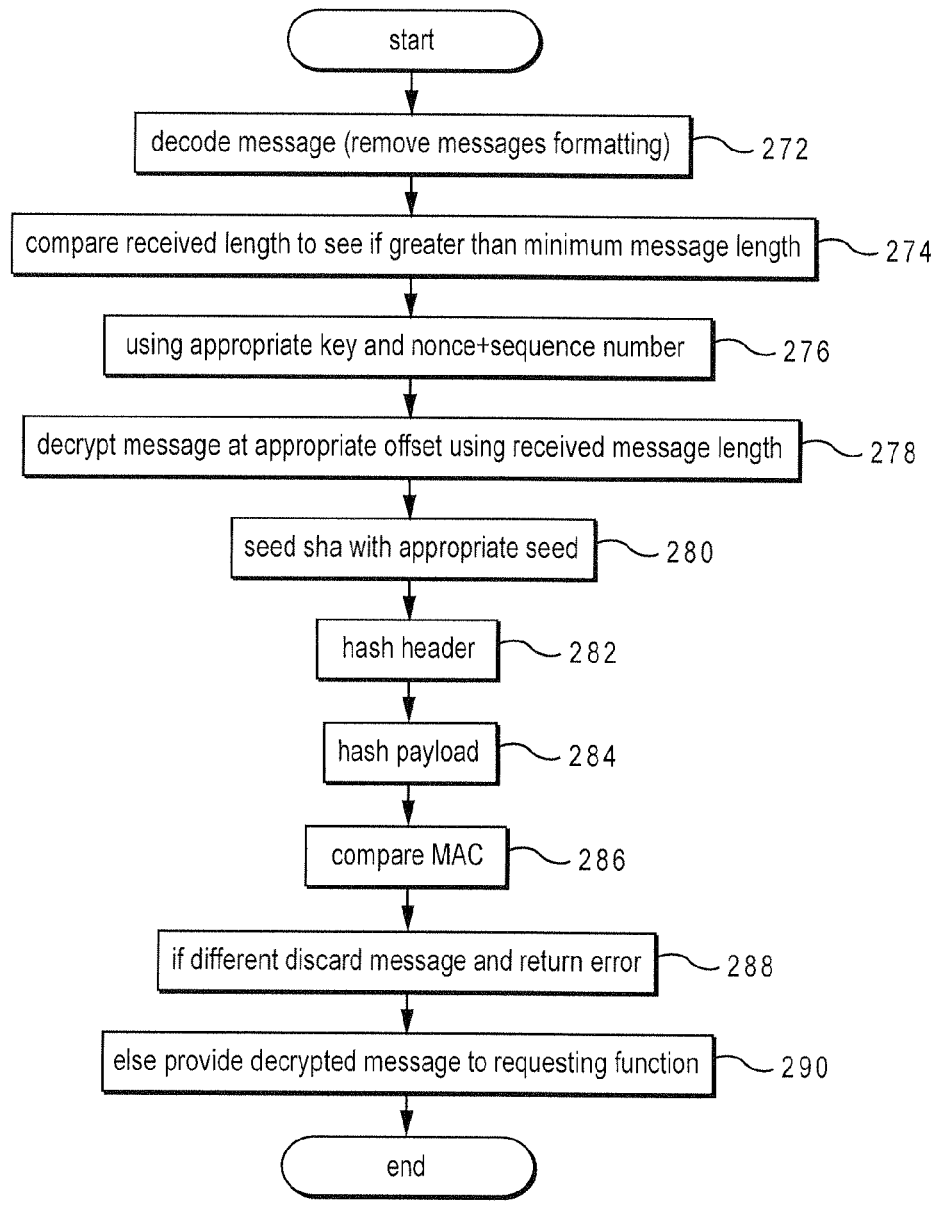

FIG. 5B shows example non-limiting illustrative steps to take when accepting a message from an incoming peer:

decode message (remove messages formatting) (272)
compare received length to see if greater than minimum message length (274)
using appropriate key and nonce+sequence number (276)
decrypt message at appropriate offset using received message length (278)
seed sha with appropriate seed (280)
hash header (282)
hash payload (284)
compare MAC (286)
if different discard message and return error (288)
else provide decrypted message to requesting function (290).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method of exchanging information to enable secure messaging between first and second messaging devices, comprising:

encapsulating a first public key associated with a first device's public-private key pair with a first identifier so that the encapsulated public key does not occupy more than half the payload available for transmitting a message;

communicating the encapsulated first public key and first identifier from the first device to the second device;

receiving, from the second device, a response including a second public key and a second identifier associated with the second device;

computing, with at least one processor, a shared secret based at least in part on the first public key and the received second public key;

deriving (a) a nonce with the at least one processor, from the shared secret;

using the nonce as at least a portion of a cryptographic initialization vector;

deriving, with the at least one processor from the shared secret, (b) a key for use with the cryptographic initialization vector to encrypt or decrypt a message communicated over the messaging network;

deriving, with the at least one processor from the shared secret, (c) a cryptographic hash value;

encrypting and/or decrypting the message with the key and the cryptographic initialization vector without requiring the nonce to be communicated between the first device and the second device; and authenticating, with the at least one processor, the received messages using the derived cryptographic hash value.

2. The method of claim 1 further including time stamping the message to securely indicate when the message was sent.

3. The method of claim 1 further including receiving an acknowledgement that the message was received.

4. The method of claim 1 wherein the encapsulation including a per message sequence number sent as a portion of the message payload occupies a maximum of a single SMS message length.

5. The method of claim 1 wherein the encapsulation including a per message sequence number sent as a portion of the message payload occupies a short message of fixed length.

6. The method of claim 1 wherein the message including a per message sequence number sent as a portion of the message payload comprises a maximum of 140 text characters.

7. A system for exchanging information to enable secure messaging comprising:

a message encapsulator that encapsulates a first public key associated with a first public-private key pair with a first identifier so that the encapsulated first public key does not occupy more than half the payload available for transmitting a message;

a communications interface that communicates the encapsulated public key and first identifier to a further device;

the communications interface receiving, from the further device, a response including a second public key and second identifier associated with the further device;

a memory device that stores executable code; and a processing arrangement coupled to the memory device, the processor executing the stored code to compute a shared secret based at least in part on the first key and the received second public key;

the processing arrangement including a cryptographic element that uses values derived from the shared secret to encrypt or decrypt a message communicated over the messaging network, the cryptographic element deriving from the shared secret: (a) a nonce for use as at least a portion of a cryptographic initialization vector, (b) a cryptographic key for use to encrypt and/or decrypt, and (c) a cryptographic hash value, using the cryptographic initialization vector along with the cryptographic key to encrypt and/or decrypt the message without requiring the nonce to be communicated to the further device, and using the cryptographic hash value for authentication of the message.

8. The system of claim 7 further including a time stamper that time stamps messages to securely indicate when messages were sent.

9. The system of claim 7 wherein the communications interface receives an acknowledgement that the message was received.

10. The system of claim 7 wherein the message encapsulator encapsulates the message with an included sequence number to occupy a maximum of a single SMS message length.

11. The system of claim 7 wherein the message encapsulator encapsulates the message with an included sequence number to occupy a short message of maximum length.

12. The system of claim 7 wherein the message with an included sequence number comprises a maximum of 140 text characters.

13. A non-transitory storage device that stores program control instruction which, when executed by a processor coupled to a communications interface, control the processor to enable lightweight peer-to-peer exchange of cryptographic information over insecure communications links by:

encapsulating a first public key associated with a first public-private key pair with a first identifier so that the encapsulated first public key does not occupy more than half the bandwidth available for transmitting a message;

communicating the encapsulated first public key and first identifier to another device;

receiving, from the other device, a response including a second public key and second identifier associated with the other device;

computing a shared secret based at least in part on the first public key and the received second public key; and using values derived from the shared secret to encrypt or decrypt a message communicated over the messaging network, including deriving from the shared secret: (a) a nonce for use as at least a portion of a cryptographic initialization vector, (b) a cryptographic hash value, and (c) at least one cryptographic encryption and/or decryption key, using the cryptographic initialization vector along with the at least one cryptographic key to encrypt and/or decrypt without requiring the nonce to be communicated with the other device, and using the cryptographic hash value for authentication.

14. The device of claim 13 wherein the encapsulation occupies a short message of fixed or variable length having a maximum length of a single SMS message.

15. The device of claim 13 wherein the encapsulation including a sequence number uses less than 15% of available SMS payload for security overhead.

16. The device of claim 13 wherein computing the shared secret is based at least in part on use of an elliptical curve.

17. The device of claim 13 wherein computing includes using the first device's own private key along with the second device's public key to generate a shared value as a common point on an elliptic curve for use as a seed input to symmetric cryptographic key generation.

18. The device of claim 13 wherein the communicating is point-to-point between the first and second devices without requiring any intermediate server therebetween.

* * * * *